US008218569B2

(12) United States Patent
DelRegno et al.

(10) Patent No.: US 8,218,569 B2
(45) Date of Patent: Jul. 10, 2012

(54) APPARATUS AND METHOD FOR TERMINATING SERVICE EMULATION INSTANCES

(75) Inventors: Nick DelRegno, Rowlett, TX (US); Scott R. Kotrla, Wylie, TX (US); David E. McDysan, Great Falls, VA (US); Michael U. Bencheck, Denison, TX (US); Matthew W. Turlington, Richardson, TX (US); Ross S. Hardin, Plano, TX (US); Richard C. Schell, Allen, TX (US); Howard Chiu, Plano, TX (US); William Drake, Garland, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1146 days.

(21) Appl. No.: 10/858,491

(22) Filed: Jun. 1, 2004
(Under 37 CFR 1.47)

(65) Prior Publication Data
US 2005/0226215 A1 Oct. 13, 2005

Related U.S. Application Data

(60) Provisional application No. 60/560,009, filed on Apr. 5, 2004.

(51) Int. Cl.
*H04J 3/16* (2006.01)
*H04L 12/28* (2006.01)
(52) U.S. Cl. ........ 370/466; 370/397; 370/399; 370/401; 370/469
(58) Field of Classification Search ........................ None
See application file for complete search history.

(56) References Cited

U.S. PATENT DOCUMENTS

| 5,412,647 | A | | 5/1995 | Giroux et al. |
| 5,805,600 | A | | 9/1998 | Venters et al. |
| 5,809,021 | A | | 9/1998 | Diaz |
| 5,910,954 | A | * | 6/1999 | Bronstein et al. ............. 370/401 |
| 5,987,034 | A | | 11/1999 | Simon et al. |

(Continued)

FOREIGN PATENT DOCUMENTS

EP 0975192 1/2000

(Continued)

OTHER PUBLICATIONS

Neogi et al., "Design and Performance of a Network-Processor-Based Intelligent DSLAM", IEEE Network, IEEE Inc., New York, US, vol. 17, No. 4, Jul. 2003, pp. 56-62.

(Continued)

*Primary Examiner* — Kwang B Yao
*Assistant Examiner* — Jutai Kao

(57) ABSTRACT

System and method for providing a termination point for service emulation instances in an access network is provided. In an embodiment, the service emulation instances are implemented utilizing, for example, pseudowires. Communications to and from the access network are aggregated and transmitted via one or more pseudowires to a service emulation instance terminator. The service emulation instance terminator converts the traffic to its native form and, if necessary, converts the traffic to a different type of format or service. The service emulation instance terminator then frames the traffic for the appropriate type of service and transmits the traffic to the service edge. Traffic received from the service is removed prepended with a pseudowire label and aggregated with other traffic. The aggregated traffic is transmitted to the customer via the access network. If necessary, an interworking function may convert the traffic from one type of service to another type of service.

84 Claims, 7 Drawing Sheets

U.S. PATENT DOCUMENTS

| | | | |
|---|---|---|---|
| 5,999,532 | A | 12/1999 | Terasaki |
| 6,205,488 | B1 | 3/2001 | Casey et al. |
| 6,333,917 | B1 | 12/2001 | Lyon |
| 6,381,649 | B1 | 4/2002 | Carlson |
| 6,499,061 | B1 | 12/2002 | Benayoun et al. |
| 6,603,756 | B1 | 8/2003 | Tappan |
| 6,634,297 | B2 | 10/2003 | Poetter |
| 6,643,297 | B1 | 11/2003 | Sproat et al. |
| 6,731,649 | B1 | 5/2004 | Silverman |
| 6,775,283 | B1 | 8/2004 | Williams |
| 6,778,494 | B1 | 8/2004 | Mauger |
| 6,870,812 | B1 | 3/2005 | Kloth et al. |
| 6,898,213 | B1 | 5/2005 | Shimelmitz et al. |
| 6,904,061 | B2 | 6/2005 | Schmitt et al. |
| 6,934,250 | B1 | 8/2005 | Kejriwal et al. |
| 6,944,168 | B2 | 9/2005 | Paatela et al. |
| 6,950,393 | B1 | 9/2005 | Ben Nun et al. |
| 6,963,561 | B1 | 11/2005 | Lahat |
| 6,977,932 | B1 | 12/2005 | Hauck |
| 6,985,488 | B2 | 1/2006 | Pan et al. |
| 7,031,312 | B1 | 4/2006 | Jayakumar et al. |
| 7,031,607 | B1 | 4/2006 | Aswood Smith |
| 7,068,654 | B1 | 6/2006 | Joseph et al. |
| 7,092,389 | B2 | 8/2006 | Chase et al. |
| 7,120,151 | B1 | 10/2006 | Ginjpalli et al. |
| 7,126,907 | B2 | 10/2006 | Carpini et al. |
| 7,130,261 | B1 | 10/2006 | Skrzynski et al. |
| 7,164,692 | B2 * | 1/2007 | Cox et al. ............ 370/466 |
| 7,227,867 | B1 | 6/2007 | Ferguson et al. |
| 7,289,538 | B1 | 10/2007 | Paradise et al. |
| 7,330,481 | B2 | 2/2008 | Jones et al. |
| 7,411,904 | B2 | 8/2008 | Foote et al. |
| 7,463,639 | B1 | 12/2008 | Rekhter |
| 7,480,306 | B2 * | 1/2009 | Unbehagen et al. ...... 370/401 |
| 2001/0036172 | A1 | 11/2001 | Haskal |
| 2002/0075542 | A1 | 6/2002 | Kumar et al. |
| 2002/0085563 | A1 | 7/2002 | Mesh et al. |
| 2002/0114274 | A1 | 8/2002 | Sturges et al. |
| 2002/0131408 | A1 | 9/2002 | Hsu |
| 2002/0146026 | A1 | 10/2002 | Unitt et al. |
| 2002/0150100 | A1 | 10/2002 | White et al. |
| 2002/0163935 | A1 | 11/2002 | Paatela et al. |
| 2002/0167949 | A1 | 11/2002 | Bremer et al. |
| 2002/0176139 | A1 | 11/2002 | Slaughter et al. |
| 2003/0012184 | A1 | 1/2003 | Walker, III et al. |
| 2003/0016672 | A1 | 1/2003 | Rosen et al. |
| 2003/0021287 | A1 | 1/2003 | Lee et al. |
| 2003/0026206 | A1 | 2/2003 | Mullendore et al. |
| 2003/0043830 | A1 | 3/2003 | Floyd et al. |
| 2003/0145246 | A1 | 7/2003 | Suemura |
| 2003/0147352 | A1 | 8/2003 | Ishibashi et al. |
| 2003/0147412 | A1 | 8/2003 | Weyman et al. |
| 2003/0185201 | A1 | 10/2003 | Dorgan |
| 2003/0231640 | A1 | 12/2003 | Basso et al. |
| 2004/0028051 | A1 | 2/2004 | Etemadi et al. |
| 2004/0028064 | A1 | 2/2004 | Cetin et al. |
| 2004/0037290 | A1 | 2/2004 | Valadarsky et al. |
| 2004/0042480 | A1 | 3/2004 | Sproat et al. |
| 2004/0044789 | A1 | 3/2004 | Angel et al. |
| 2004/0066780 | A1 | 4/2004 | Shankar et al. |
| 2004/0076166 | A1 | 4/2004 | Patenaude |
| 2004/0081172 | A1 | 4/2004 | Ould-Brahim |
| 2004/0088430 | A1 | 5/2004 | Busi et al. |
| 2004/0090967 | A1 | 5/2004 | Doidge et al. |
| 2004/0153570 | A1 | 8/2004 | Shobatake |
| 2004/0156313 | A1 | 8/2004 | Hofmeister et al. |
| 2004/0156389 | A1 | 8/2004 | Sha |
| 2004/0158626 | A1 | 8/2004 | Douglas |
| 2004/0162919 | A1 | 8/2004 | Williamson et al. |
| 2004/0165600 | A1 | 8/2004 | Lee |
| 2004/0170160 | A1 | 9/2004 | Li et al. |
| 2004/0170167 | A1 | 9/2004 | Cohen |
| 2004/0170173 | A1 * | 9/2004 | Pan et al. ............ 370/392 |
| 2004/0174882 | A1 | 9/2004 | Willis |
| 2004/0179555 | A1 * | 9/2004 | Smith ............ 370/521 |
| 2004/0190548 | A1 * | 9/2004 | Harel et al. ............ 370/466 |
| 2004/0208198 | A1 | 10/2004 | Christie et al. |
| 2004/0213232 | A1 | 10/2004 | Regan |
| 2004/0221051 | A1 | 11/2004 | Liong et al. |
| 2004/0246891 | A1 | 12/2004 | Kay et al. |
| 2004/0252717 | A1 * | 12/2004 | Solomon et al. ............ 370/466 |
| 2004/0255028 | A1 | 12/2004 | Chu et al. |
| 2005/0002333 | A1 | 1/2005 | Aalders et al. |
| 2005/0044262 | A1 * | 2/2005 | Luo ............ 709/238 |
| 2005/0047341 | A1 | 3/2005 | Kim et al. |
| 2005/0141504 | A1 * | 6/2005 | Rembert et al. ............ 370/392 |
| 2005/0147104 | A1 | 7/2005 | Ould-Brahim |
| 2005/0160180 | A1 | 7/2005 | Rabje et al. |
| 2005/0190757 | A1 * | 9/2005 | Sajassi ............ 370/389 |
| 2006/0002419 | A1 | 1/2006 | Cox et al. |
| 2006/0018313 | A1 | 1/2006 | Oki et al. |
| 2006/0159019 | A1 | 7/2006 | Buskirk et al. |
| 2006/0209840 | A1 | 9/2006 | Paatela et al. |
| 2007/0274321 | A1 | 11/2007 | Jonsson et al. |
| 2007/0286198 | A1 | 12/2007 | Muirhead et al. |
| 2008/0159174 | A1 | 7/2008 | Enomoto et al. |
| 2009/0080431 | A1 | 3/2009 | Rekhter |

FOREIGN PATENT DOCUMENTS

| | | |
|---|---|---|
| EP | 1133121 | 9/2001 |
| WO | WO-98/39879 | 9/1998 |
| WO | 00/46961 | 8/2000 |
| WO | WO-00/54469 | 9/2000 |
| WO | 01/67804 | 9/2001 |
| WO | 02/15475 | 2/2002 |
| WO | 03/005648 | 1/2003 |
| WO | WO-03/019873 | 3/2003 |
| WO | WO-2004/049644 | 6/2004 |

OTHER PUBLICATIONS

Stein, "Pseudowire Customer Edge to Customer Edge Emulation", Pseudo-Wire Edge-to-Edge Working Group, PWE3 Internet Draft, Oct. 20, 2003.

"IEEE Standards for Local and Metropolitan Area Networks: Virtual Bridged Local Area Networks", IEEE Computer Society, Copyright 1999, IEEE Std. 802.1Q-1998.

Pretty et al., "Frame Relay Interworking with Asynchronous Transfer Mode", Global Telecommunications Conference, 1993, IEEE Houston, TX, US, Nov. 29-Dec. 2, 1993, pp. 1854-1860.

Walton, "Frame Relay to ATM Interworking" BT Technology Journal, BT Laboratories, GB, vol. 16 No. 1, Jan. 1998, pp. 96-105.

Williams, Mark, "Optical Ethernet Architecture Evolution: The Logical Provider Edge," Metro Ethernet Forum (Aug. 28, 2003) pp. 1-35.

Lang, Tao, "Making the Fiber Connection," Fiberoptic Product News, vol. 19, No. 2, Reed Electronic Group, New Jersey (Feb. 2004) 2 pages.

Zelig, et al., "Pseudo Wire (PW) Management Information Base," [on-line] [Last visited on: Jan. 26, 2004] http://www.ietf.org/internet-drafts/draft-ietf-pwe3-pw-mib-03, pp. 1-42.

Shah, et al., "Qos Signaling for PW," [on-line] [Last visited on: May 27, 2004] http://www.ietf.org/internet-drafts/draft-shah-pwe3-pw-qos-signaling-00, pp. 1-7.

Bryant, et al., "PWE3 Architecture," [on-line] [Last visited on: May 27, 2004] http://www.ietf.org/internet-drafts/draft-ietf-pwe3-arch-06, pp. 1-34.

Xiao, et al., "Requirements for Pseudo-Wire Emulation Edge-to-Edge (PWE3)," [on-line] [Last visited on: Jan. 17, 2004] http://www.ietf.org/internet-drafts/draft-oetf-pwe3-requirements-08,. pp. 1-20.

Martini, et al., "Pseudowire Setup and Maintenance Using LDP," [on-line] [Last visited on: Jun. 1, 2004] http://www.ietf.org/internet-drafts/draft-ietf-pwe3-control-protocol-06, pp. 1-31.

Zelig, et al., "Ethernet Pseudo Wire (PW) Management Information Base," [on-line] [Last visited on: Jan. 26, 2004] http://www.ietf.org/internet-drafts/draft-ietf-pwe3-enet-mib-03, pp. 1-21.

Zelig, et al., "Pseudo Wire (PW) Over MPLS PSN Management Information Base," [on-line] [Last visited on: Feb. 3, 2004] http://www.ietf.org/internet-drafts/draft-ietf-pwe3-pw-mpls-mib-04, pp. 1-25.

Nadeau, et al., "Pseudo Wire (PW) Virtual Connection Verification," [on-line] [Last visited on: May 27, 2004] http://www.ietf.org/internet-drafts/draft-oetf-pwe3-vccv-02, pp. 1-16.

Bonica, et al., "ICMP Extensions for Multiprotocol Label Switching," [on-line] [Last visited on: May 27, 2004] http://www.ietf.org/internet-drafts/draft-bonica-icmp-mpls-02, pp. 1-10.

Martini, Luca, et ai., "Transport of Layer 2 Frames Over MPLS", Luca Martini Nasser El-Aawar Level 3 Communications et al:

"Transport of Layer 2 Frames Over MPLS; draft-ietf-pwe3-control-protocol-01.txt" IETF Standard-Working-Draft, Internet Engineering Task Force, IETF, CH, vol. pwe3, No. I, Nov. 1, 2002.

* cited by examiner

APPARATUS AND METHOD FOR TERMINATING SERVICE EMULATION INSTANCES

PRIORITY CLAIM AND CROSS-REFERENCE TO RELATED APPLICATIONS

The present application claims priority to U.S. Provisional Patent Application Ser. No. 60/560,009, filed Apr. 5, 2004, entitled "System and Method for Using Labeled Flows in a Communications Access Network," assigned to the assignee of the present application and incorporated herein by reference its entirety.

The present application is also related to the following co-pending applications, which are assigned to the assignee of the present application and incorporated herein by reference in their entireties:

U.S. patent application Ser. No. 10/858,502, filed concurrently herewith and entitled "System and Method for a Communications Access Network;"

U.S. patent application Ser. No. 10/858,501, filed concurrently herewith and entitled "System and Method for Controlling Communication Flow Rates;"

U.S. patent application Ser. No. 10/858,503, filed concurrently herewith and entitled "Method and Apparatus for Processing Labeled Flows in a Communications Access Network;"

U.S. patent application Ser. No. 10/858,517, filed concurrently herewith and entitled "System and Method for Providing A Multiple-Protocol Crossconnect;" and U.S. patent application Ser. No. 10/858,525, filed concurrently herewith and entitled "System and Method for Managing Communications In An Access Network."

TECHNICAL FIELD

The present invention relates generally to a system and method for providing communications services, and more particularly, to a system and method for providing a termination point for a flow in an access network.

BACKGROUND

A commercial telecommunications network operated by a service provider supports voice and data communications between customer locations and includes an access network and a core network. Generally, customer devices communicatively couple to the access network, which in turn connects to the core network. The access network includes what many people refer to as "the last mile," that is, the connectivity from a customer location, such as an office building, to a point where a service provider has significant facilities, such as a metro hub or a "service edge" at the periphery of the core network. In contrast to the access network, the core network usually provides transport of large aggregate flows over long distances and handles the selective routing of each customer's voice and data traffic to other locations served by the network. The access network generally comprises a series of switches, aggregators, multiplexers, demultiplexers, routers, hubs, and the like which collectively serve to provide connectivity between customers' equipment and the core network.

Customer sites in the vicinity of a service provider's edge, or an intermediate hub that provides connection to the service edge, must be connected to the service edge via some form of access circuit. Traditionally, it has been more practical for a core network service provider to operate a few strategically placed facilities to serve a large number of customers in a metropolitan area rather than to extend the service provider's core network to every physical location where customers may reside. Providing access services between a customer's location and a metro hub or a service edge may involve installing electrical or optical cables between the service provider and the customer site. In some cases, the service provider installs and owns this access link connected directly to the customer location. More often, however, the existing facilities of a local telephone carrier are leased to provide this connectivity. The well-established local telephone facilities provide at least twisted-pair subscriber loop connectivity to virtually every potential customer location in a metropolitan area. In the case of larger business locations and multi-tenant commercial sites, local telephone facilities typically comprise a large quantity of telephone wires or broadband access to the sites.

The services required by customers, residential or business, vary greatly in the type of access services, bandwidth, quality of service (QoS), type of legacy equipment, and the like. Types of services typically include frame relay services, asynchronous transfer mode (ATM) services, broadband services, point-to-point private line services, voice services, and the like. Typically, the access network provides transport, aggregation, grooming, and switching for each of these types of services independently, which in turn requires the access service provider to provision each of these services separately. Each type of service utilizes different interface and framing standards, and in particular, each type of service typically utilizes different sets of protocols. As a result, current switches must be equipped to interface with and evaluate flows for each type of interface for which the switch is expected to route.

Accordingly, there is a need to reduce the burden associated with supporting the various types of services throughout the access network and to aggregate traffic prior to transmitting the traffic through the access network.

SUMMARY OF THE INVENTION

These and other problems are generally solved or circumvented, and technical advantages are generally achieved, by embodiments of the present invention that provide a termination point for a flow in an access network.

In accordance with an embodiment of the present invention, an apparatus for processing service emulation communications is provided. The apparatus comprises a service emulation interface for receiving service emulation communications; a service emulation end point component communicatively coupled to the service emulation interface, the service emulation end point component being configured to convert service emulation communications to communications conforming to a first transport; and an interworking function communicatively coupled to the service emulation end point component configured to convert the communications conforming to the first transport to communications conforming to a second transport.

In accordance with another embodiment of the present invention, an apparatus for processing service emulation communications is provided. The apparatus comprises a service emulation interface communicatively coupled to a user of a first transport, the service emulation interface being configured to receive service emulation communications; a service emulation end point component communicatively coupled to the service emulation interface, the service emulation end point component being configured to extract service emulation communications from a service emulation instance; and an interworking function communicatively coupled to the service emulation end point component, the interworking function being configured to convert the service emulation communications conforming to the first transport to communications conforming to a second transport.

In accordance with yet another embodiment of the present invention, an apparatus for processing service emulation communications having one or more service emulation instances is provided. The apparatus comprises means for terminating a service emulation instance; means for extracting service emulation communications from the service emulation instance, the service emulation communications conforming to a first transport; and means for converting the service emulation communications from the first transport to communications conforming to a second transport.

In accordance with yet another embodiment of the present invention, an apparatus for processing service emulation communications is provided. The apparatus comprises an interworking function communicatively coupled to a service edge, the interworking function being configured to convert communications conforming to a first transport to communications conforming to a second transport; a service emulation end point component communicatively coupled to the interworking function, the service emulation end point component being configured to encode communications conforming to the second transport into service emulation communications; and a service emulation interface communicatively coupled to the service emulation end point component and an access network, the service emulation interface being configured to transmit service emulation communications on a service emulation instance.

In accordance with yet another embodiment of the present invention, an apparatus for processing service emulation communications is provided. The apparatus comprising a pseudowire terminator communicatively coupled to an access network, the pseudowire terminator being configured to act as one end of a pseudowire to receive communications corresponding to a first transport; and a framer communicatively coupled to a service edge and the interworking function, the framer being configured to insert framing data prior to transmission to the service edge.

In accordance with yet another embodiment of the present invention, an apparatus for processing service emulation communications is provided. The apparatus comprises a framer communicatively coupled to a service edge, the framer being configured to extract communications conforming to a first transport; and a pseudowire terminator communicatively coupled to an access network and the framer, the pseudowire terminator being configured to act as one end of a pseudowire to transmit the communications on a pseudowire.

In accordance with yet another embodiment of the present invention, a method for processing service emulation communications is provided. The method comprises receiving service emulation communications on a service emulation instance from a customer via an access network, the service emulation communications corresponding to a first transport; converting the service emulation communications to a second format corresponding to a second transport; and transmitting the service emulation communications in the second format to a service edge on a communications link corresponding to the second transport.

In accordance with yet another embodiment of the present invention, a method for processing service emulation communications is provided. The method comprises receiving communications in a first format associated with a first transport; removing framing information associated with the first transport; converting the communications to a second format corresponding to a second transport; encoding the communications to form service emulation communications; transmitting the service emulation communications over a service emulation instance.

In accordance with yet another embodiment of the present invention, a computer program product for processing service emulation communications is provided. The computer program product comprises computer program code for receiving service emulation communications on a service emulation instance from a customer via an access network, the service emulation communications corresponding to a first transport; converting the service emulation communications to a second format corresponding to a second transport; and transmitting the service emulation communications in the second format to a service edge on a communications link corresponding to the second transport.

In accordance with yet another embodiment of the present invention, a computer program product for processing service emulation communications is provided. The computer program product comprises computer program code for receiving communications in a first format associated with a first transport; removing framing information associated with the first transport; converting the communications to a second format corresponding to a second transport; encoding the communications to form service emulation communications; and transmitting the service emulation communications over a service emulation instance.

Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

The present invention will be described with respect to embodiments in a specific context, namely, providing switching and routing services in an access network utilizing layer 2 service emulation instances. The invention may also be applied, however, to other types of devices, networks, communications links, and the like. Furthermore, while specific network configurations are illustrated and discussed herein, it is noted that network configurations may vary to include fewer or additional elements, such as routers, gateways, bridges, ATM switches, frame relay switches, firewalls, switches, and the like. The illustrated embodiments are provided only for illustrative purposes and only to aid in the explanation and understanding of the concepts of the present invention. Aspects of the present invention are equally applicable to many types and configurations of networks and communications protocols.

It is further noted that, unless indicated otherwise, all functions described herein may be performed in either hardware or software, or some combination thereof. In an embodiment, the functions are performed by a processor such as a computer or an electronic data processor in accordance with code such as computer program code, software, and/or integrated circuits that are coded to perform such functions, unless indicated otherwise.

Figure 1:
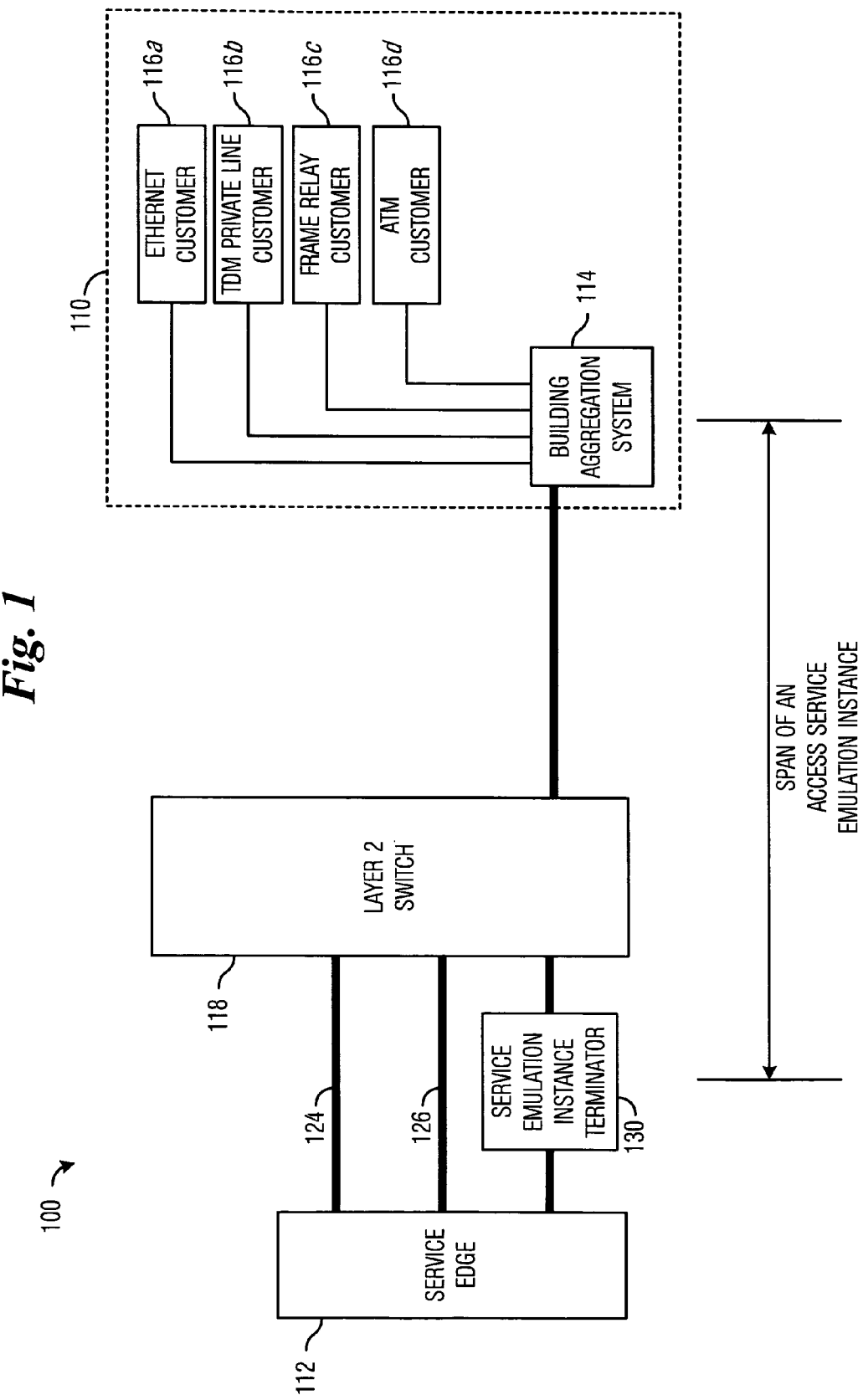
FIG. 1 is a network diagram in accordance with an embodiment of the present invention.

FIG. 1 is a network diagram in accordance with an embodiment of the present invention. FIG. 1 illustrates an access network 100 by which a customer site 110 is coupled to, and accesses the services of, a service edge 112. Generally, the service edge 112 represents the access points to a service provider's network, which may comprise one or more core networks (not shown). A core network may comprise, for example, a system of TDM switches, such as a network of Class 3 telephone switches. A core network may also comprise an ATM and/or a frame relay network covering much the same geographical territory as the TDM network. Moreover, a network of IP routers may also be supported in the core network. While these networks may overlap or cover much the same geographical territory, each are designed to efficiently carry particular types of traffic or exhibit particular properties that are amenable to certain types of traffic. Although this "multiplanar" network situation may frequently be encountered, it should be understood that the present invention may be equally applicable to a converged core network where native layer 2 handoff at the service edge is preferred. Service edge 112 is illustrated as a single network element for illustrative purposes only, and may actually include multiple network elements or multiple access interfaces having different capabilities.

By way of example, sources of different types of communications are depicted within customer site 110. One of the sources is Ethernet customer 116a coupled to a building aggregation system 114 over any form of connectivity amenable to Ethernet traffic, such as a 100BaseT, Gigabit Ethernet (GbE) or DSL connection. Another source of traffic may be private line customer 116b, which is coupled to the building aggregation system 114 via DS1 line. Source 116c represents frame relay customers having their frame relay traffic carried over TDM facilities such as DS1 lines to the building aggregation system 114. Asynchronous transfer mode (ATM) customer 116d represents ATM customers having their ATM cell traffic carried over TDM facilities such as DS1 lines to the building aggregation system 114. Other types of connections may be used as required to support specific customers' needs. Each of the CPE 116 may comprise one or more devices. For example, the Ethernet customer 116a typically includes a router communicatively coupled to other routers, hubs, user workstations, servers, or the like. The CPE 116a-116d are collectively referred to as CPE 116.

To provide connectivity toward service edge 112, the building aggregation system 114 is coupled to a layer 2 switch 118 via a communications link 113 such as a DS3 communications link or the like. The layer 2 switch 118 provides switching and routing of traffic based upon information applied to the traffic, the information corresponding roughly to Layer 2 or the "data link layer" of the OSI Reference Model, and without having to examine the content of the customer data in the traffic.

An example of a building aggregation system 114 suitable for use with the present invention is disclosed in U.S. patent application Ser. No. 10/858,503, entitled "Method and Apparatus for Processing Labeled Flows in a Communications Access Network", which is incorporated herein by reference.

Communications link 113 communicatively coupling the building aggregation system 114 and the layer 2 switch 118 may be any suitable communications link, such as an optical fiber, optical ring, a gigabit Ethernet (GbE) connection, or the like. It is also worth noting that the layer 2 switch 118 may be coupled to a large number of customer sites 110 and building aggregation systems 114 to perform an intermediate aggregation and distribution function within the access network 100. The layer 2 switch 118 may also be coupled directly to the CPE 116.

In accordance with the present teachings, the building aggregation system 114, or some other network element, can be equipped to serve as one end of a plurality of carrier-tagged flows. A carrier-tagged flow represents a logical communications channel or flow established to carry carrier-tagged communications between two or more parties, or two or more points served by a communications system. The carrier-tagged communications can be voice, data, audio, video, or any other type of communications. A carrier-tagged flow may be implemented using a service emulation instance, such as a pseudowire as described in an IETF draft document entitled "draft-ietf-pwe3-arch-06.txt" or successive versions thereof. This technology allows a packet-switched network to emulate other types of packet or TDM transport services. For example, a pseudowire may be implemented in an Ethernet network, yet may provide transport of communications that mimics the attributes and performance of common data link protocols, such as ATM, frame relay, as well as SONET/SDH or DSn signals. An Ethernet-based pseudowire may employ variable length packets even when carrying fixed-length cells or frames, such as 53-byte ATM cells. A pseudowire is typically implemented along a tunnel implemented in a packet-switched network. Some types of tunnels that may be suitable for carrying pseudowires, or even other types of communications that may be employed in conjunction with the present teachings, include Label Switched Paths (LSPs) according to the MultiProtocol Label Switching (MPLS) protocol, Layer 2 Tunneling Protocol (L2TP) tunnels, IPsec tunnels, etc.

Each service emulation instance is identified by a service emulation instance mapping identifier. For example, the service emulation instance may be implemented as a pseudowire that is identified by a service emulation instance mapping identifier such as a pseudowire label or the like. Service emulation instance mapping identifiers may be locally significant on any port and can be swapped on a hop-by-hop basis as needed to provide a large number of flows using the finite number of identifier values that are available (approximately 1 million in the case of pseudowire labels). In this manner, switching in the access network can be simplified by encapsulating traffic in service emulation instances and by interpreting and manipulating the corresponding service emulation instance identifiers. The access network may transparently support a mixture of flow types and customer content, including any customer-specific addressing or virtual networking fields imbedded in the customer content. The pseudowire architecture as described in documents promulgated by the Internet Engineering Task Force (IETF) provides one example of a service emulation approach involving encapsulation and labeling of traffic. It should be noted, however, that other protocols may be used, and embodiments of the present invention may be implemented with other types of protocols and physical connections.

The building aggregation system 114 couples traffic of various types, such as traffic from the CPE 116a-116d, onto the appropriate corresponding service emulation instances that have been established to emulate the type of transport suitable for each type of traffic. It should be noted that while in one embodiment the building aggregation system 114 serves as one end of the service emulation instances, other embodiments may be implemented in which the CPE 116, the layer 2 switch 118, or some other intermediate device acts as one end of the service emulation instances.

A service emulation instance terminator 130 may serve as the other end of service emulation instances. Where service emulation instances are used as carrier-tagged flows, a service emulation instance terminator 130 may serve as the other end of a number of service emulation instances which have originated at one ore more building aggregation systems 114 and passed through layer 2 switche 118. The service emulation instance terminator 130 switches or routes traffic from service emulation instances to a corresponding port and/or flow communicatively coupled to the service edge 112. In this manner, the building aggregation system 114, layer 2 switch 118, service emulation instance terminator 130, and communications links therebetween may coordinate to simultaneously function as any of the various data-link layer transport types that may be required by customers, including ATM, frame relay, TDM, Ethernet/IP, and the like.

It should be noted that the service emulation instance terminator 130 is shown as a single and separate component within the access network for illustrative purposes only. The service emulation instance terminator 130 may be a plurality of components or may be incorporated into one or more other components, such as the layer 2 switch 118, the service edge 112, or the like. Consequently, a service edge 112 may effectively incorporate the functions of a service emulation instance terminator 130 or may otherwise be capable of directly accepting and processing carrier-tagged flows. In this case, a service edge 112, or some portion thereof, may be coupled more or less directly to layer 2 switch 118 and the communications to and from the service edge may bear flow-identifying carrier tags in the form of pseudowire labels, tunnel labels, VLAN tags or the like. Service emulation instance terminator 130 may nevertheless be useful in situations where an existing or legacy portion of a service edge lacks the ability to handle carrier-tagged access communications. As mentioned earlier, service edge 112 may actually represent several separate access points, perhaps to different types of core networks. Some access points within service edge 112 may be amenable to carrier-tagged flows whereas others may not be. Links 124 and 126 may represent links to TDM—capable ports on the service edge from TDM ports on layer 2 switch 118. It is also possible that, for example, one or both of these links may represent packetized data links and may even represent a service edge that is able to accept carrier-tagged flows, such as carrier-tagged pseudowires, directly without requiring service emulation instance terminator 130.

It should also be noted that the service emulation instance terminator 130 can be implemented using a computer having a system unit and a machine-readable medium to direct the operation of the computer. The computer may also have a video display terminal, an alphanumeric input device (e.g., a keyboard) having alphanumeric and other keys, and a mouse or other pointing device. Examples of a computer that may be used in accordance with the present invention include rack-mounted processing boards, personal computers, workstations, mini-computers, or the like.

In an exemplary embodiment, Ethernet is utilized as the link-based layer 2 protocol over which service emulation communications are transmitted. The application of Ethernet in the access network can be based on TDM encapsulation, using X.86 or GFP, e.g. Ethernet over SONET (EoS). Other protocols may be used as a basis upon which other services may be emulated. In an exemplary embodiment, variable length Ethernet frames are used to emulate layer 1 and layer 2 services.

In operation, the building aggregation system 114 receives Ethernet traffic from Ethernet customer 116a via the building "riser." The building aggregation system 114 receives this traffic along a port that is known to correspond to Ethernet customer 116a and, having coordinated with at least service emulation instance terminator 130, maintains an association between the customer's port and Ethernet traffic stream and a corresponding service emulation instance. Likewise, at the other end of the service emulation instance, the service emulation instance terminator 130 delivers the customer's traffic to the service edge 112 and coordinates with the service edge 112, such as by mapping of port numbers or directing of flows, to ensure that the network identifies the customer's traffic as such and appropriately handles the traffic.

To establish or modify the customer's service emulation instance established between the CPE 116 and the service edge 112, the customer may indicate to the network service provider the desire to establish communications in a particular manner. This request may be submitted either manually or automatically through a user network interface (UNI). As will be described in greater detail below, the establishment of communications through the access network shown may originate in a variety of ways. To coordinate fulfillment of an access communications request, a network management system, provisioning function, or the like, may dispatch provisioning and configuration instructions to the building aggregation system 114, the layer 2 switch 118, the service emulation instance terminator 130, or other network elements.

Figure 2:
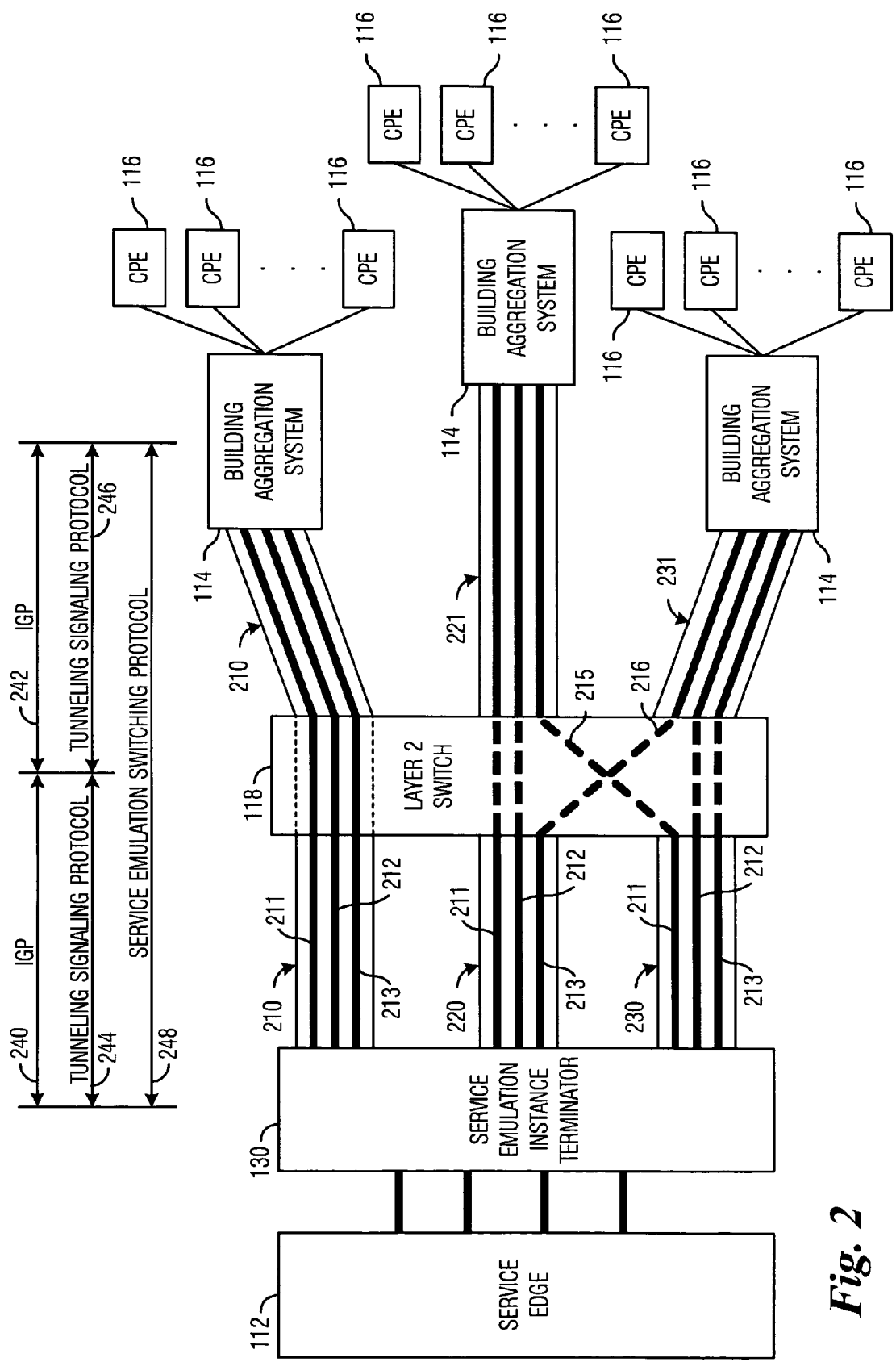
FIG. 2 is logical view of service emulation instances in accordance with an embodiment of the present invention.

FIG. 2 is a logical view of service emulation instances in accordance with an embodiment of the present invention. As described before, one purpose of an access network is to efficiently and flexibly couple customer sites (represented by building aggregation systems 114 communicatively coupled to the CPE 116) to the edge of a service provider's network represented by the service edge 112. The layer 2 switch 118 is shown as an intermediary and may participate in grooming, aggregating and directing communications traffic in the access network, as well as performing crossover switching between TDM ports and packet-oriented ports. Note that FIG. 2 illustrates two-hop paths, although it is possible that there are some intervening transmission elements or another layer 2 switch 118 along the access coupling.

In FIG. 2, multi-protocol label switching (MPLS) label switched paths (LSPs) 210, 220, 221, 230, and 231 are shown to have been established between various building aggregation systems 114 and the service edge 112 for illustrative purposes. Each LSP corresponds to a pathway or a means of forwarding traffic from the building aggregation system 114 to the service edge 112 and may comprise one or more service emulation instances, e.g., service emulation instances 211, 212, and 213, that may carry traffic based upon service emulation instance mapping identifiers prepended to the traffic and a mutual understanding among the network elements as to how to handle traffic having a specific tag value.

Each LSP may accommodate one or more service emulation instances, and each service emulation instance can be of a specific type. By virtue of VLAN "stacking" and having different layer 2 addresses present in the traffic that may be encapsulated, each service emulation instance 211, 212, 213 may carry multiple customer-specified flows. This behavior can be controlled by the customer and can be transparent to the access network 100. In accordance with the present teachings, the access network may be unconcerned with anything but the outermost labels or carrier tags applied for access network purposes, such as tunnel labels or service emulation instance mapping identifiers.

It should be noted that label switched path 210 represents one embodiment of the present invention in which the label switched path is routed via a tunnel label. In other words, each unit of traffic (frame, packet, etc.) is tagged with a tunnel label and elements use the tunnel label to determine how to process and where to send the traffic. In this situation, each service emulation instance within the tunnel identified by the tunnel label, e.g., label switched path 210, is routed or switched in the same manner, as illustrated by the dotted label switched path line and the solid service emulation instance lines through the layer 2 switch 118. In an alternative embodiment, a service emulation instance may be routed or switched based upon a service emulation instance mapping identifier. In this situation, the label switched paths are established between the various building aggregation systems 114 and the layer 2 switch 118 and between the layer 2 switch 118 and the service edge 112. Where tunnels are established on a hop-by-hop basis, such as tunnel 231 between building aggregation system 114 and layer 2 switch 118, tunnel labels may be optional and switching within layer 2 switch 118 may be based upon a service emulation instance mapping identifier present in the traffic as just described.

For example, reference numerals 220 and 230 indicate label switched paths established between the layer 2 switch 118 and the service emulation instance terminator 130, and reference numerals 221 and 231 indicate label switched paths established between various building aggregation systems 114 and the layer 2 switch 118. Each of the service emulation instances within label switched paths 220, 221, 230, and 231 may be routed or switched independently of each other, as indicated by the dotted service emulation instance lines 215 and 216 through the layer 2 switch. The tunnel label and service emulation instance mapping identifier are discussed in greater detail below with reference to FIG. 3.

As depicted by reference numeral 248, a label selection or service emulation switching protocol, such as the Label Distribution Protocol (LDP), may be exercised among the service emulation instance/LSP end points, namely the building aggregation system 114 and the service emulation instance terminator 130. Reference numerals 240 and 242 represent the choice of routing between the building aggregation system 114 and the layer 2 switch 118 and between the layer 2 switch 118 and the service emulation instance terminator 130. Identifying and selecting the appropriate paths through the access network may be accomplished using an interior gateway protocol (IGP) such as the Open Shortest Path First-Traffic Engineered (OSPF-TE) approach as described in Internet Engineering Task Force's (IETF's) Request For Comments (RFCs) 2328, 2676, et al., which are incorporated herein by reference. Other routing protocols are known and may be used.

Reference numerals 244 and 246 indicate that a tunneling signaling protocol, such as the Resource Reservation Protocol (RSVP), may also be used in conjunction with other techniques during establishment of the label switched paths so that the elements involved along the path commit to allocating a specific quantity of bandwidth and other resources to support the requested flow. Alternatively, it is possible to establish static LSPs wherein no signaling is required.

Multiprotocol label switching (MPLS) is described in documents IETF's RFCs 3031, 2702, et al. maintained by the Internet Engineering Task Force (IETF), which are incorporated herein by reference. Related to the negotiation of labels that are used in MPLS, the label distribution protocol (LDP) is described in IETF's RFC 3036, which is also incorporated herein by reference. The label distribution protocol is also discussed in an IETF Draft entitled "draft-ietf-pwe3-control-protocol-06.txt" or successive versions thereof. The use of RSVP, MPLS and LDP are shown by way of example only and should not be construed as limiting the ways in which the present invention may be implemented.

FIG. 2 is provided as a logical view and various physical implementations may be used. For example, each of the label switched paths 210, 220, and 230 may be transported over one or more communications links. It should also be noted that the flows 211, 212, and 213 are illustrated as remaining together within each of the labeled switched paths 210, 220, and 230 for illustrative purposes only. Upon reaching a switching point, such as layer 2 switch 118, at the terminus of a tunnel, such as label switched path 221, each flow through the access network may be switched independently based upon, among other things, the type of service being provided, the requested service edge, one or more aspects of the traffic, and the like. This switching possibility is depicted by dashed lines 215 and 216 in FIG. 2.

Once the service emulation instance is established, the building aggregation system 114 maintains an association between the service emulation instance mapping identifier and the port and/or virtual circuit through which the customer's traffic is received. Thus, as traffic is received along this port, it is coupled to the correct service emulation instance that has been established. For example, the traffic from CPE 116a-116d enter through respective ports of the building aggregation system 114 and are coupled onto suitably configured service emulation instances.

In practice, the frame relay traffic from the CPE 116c, although passing through DS1 lines in the building riser, may be extracted as frame relay frames by the building aggregation system 114 and coupled into FR-type service emulation instances. This is more efficient than passing the FR-laden DS1 communications, as such, through a service emulation instance. The DS1 circuit would unnecessarily reserve a constant bandwidth at all times whereas carrying the frame relay traffic allows for multiplex gains, including statistical multiplexing.

The service emulation instance terminator 130 may terminate a large number of service emulation instances that have originated from one or more building aggregation systems 114. The service emulation instance terminator 130 may be viewed as "front ending" the service edge 112. At the service emulation instance terminator 130, the various service emulation instances are terminated and the traffic carried through each service emulation instance is recovered and passed to the service edge 112 appropriate for the type of traffic.

Typically, frame relay traffic arriving through a service emulation instance is to be passed along to a frame relay core network, if there is one. Likewise, TDM traffic should be passed along to a TDM network, and Ethernet or IP traffic should be passed along to a packet-switched service network in the core. It may be desirable in some situations to carry a first type of transport over a second type of transport for example, carrying IP traffic over a SONET TDM core network to efficiently utilize existing networks. Consequently, the service emulation instance terminator 130 may also provide interworking or adaptation so that frame relay traffic that arrives through a service emulation instance may be passed along to an Ethernet-based service edge element for transport over something other than an end-to-end frame relay network.

For convenience, the operation of embodiments of the present invention discussed herein are described in terms of traffic flowing from the CPE 116 to the service edge 112. However, it should be noted that the same techniques discussed herein also handle traffic leaving the service edge and being distributed to an appropriate customer end point. Every element may serve a complementary role related to the direction of flow. The service emulation instance terminator 130 receives aggregated flows from the service edge 112 and sends the traffic to a layer 2 switch 118 over a communications link, but it also receives traffic from a layer 2 switch 118 over the communications link and distributes the traffic to the appropriate service edge 112. The layer 2 switch 118 and the building aggregation system 114 may also operate bi-directionally. The service emulation instance terminator 130 may also perform aggregation services to aggregate flows from a plurality of service edges to one or more flows to be transmitted to the building aggregation system 114.

The possible bi-directionality of some traffic may have implications for the establishment of pseudowires if MPLS tunnels or the like are utilized. For example, where an RSVP/LDP mechanism is used to establish label switched paths, a bi-directional link may require initiating the formation of a path in one direction, originating at the building aggregation system 114, and forming the corresponding path in the reverse direction by originating an RSVP request from the service emulation instance terminator 130. These paths will be independently formed, may have different QoS requirements, and may take different routes between the building aggregation system 114 and the service emulation instance terminator 130.

Figure 3:
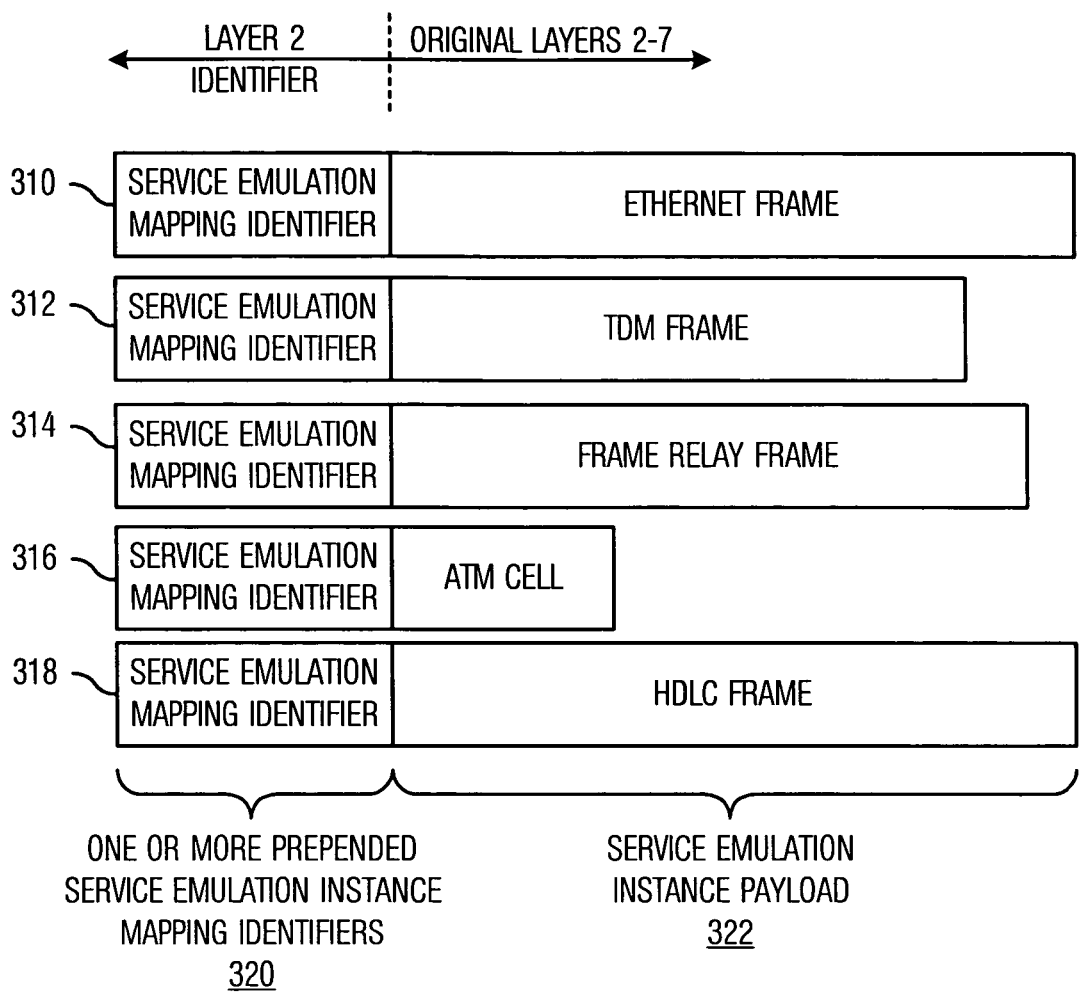
FIG. 3 is a diagram illustrating the use of service emulation in accordance with an embodiment of the present invention.

FIG. 3 illustrates examples of data messages or frames that may be transmitted into the access network, or received from the access network, by the service emulation instance terminator 130 in accordance with an embodiment of the present invention. Each of messages 310-318 have two portions: a carrier-tagged flow payload 322 and one or more prepended carrier tags 320. The carrier-tagged flow payload 322 represents, for example, the information as it is received from customer premise equipment at the customer site. The different types of messages shown correspond to various formats associated with a particular type of CPE interface, such as, for example, an Ethernet frame message 310, a TDM frame message 312, a frame relay frame message 314, an ATM cell message 316, or the like. Other messages, such as a high-level data link control (HDLC) frame 318, an ATM Application Adaptation Layer 5 (AAL5) protocol data unit (PDU), or the like, may also be used. In general, the messages will carry various types of customer data corresponding to layers 2-7 of the OSI Reference Model.

As FIG. 3 shows, each message type may be tagged and processed in a uniform manner by the addition of one or more carrier tags. FIG. 3 reflects the format of composite messages that are sent between a building aggregation system 114, a service edge 112 and any other intervening elements. As illustrated in FIG. 3, the carrier-tagged flow payload 322 is kept substantially intact and a carrier tag 320 is prepended to the carrier-tagged flow payload 322 to prepare it for transmission through the access network. Depending on implementation, the carrier tag 320 may comprise, for example, a pseudowire label, a VLAN identifier, a tunnel label or the like. Multiple carrier tags may be stacked within a message or frame to provide for a hierarchical aggregation and routing mechanism to be implemented in the access network.

It is particularly noteworthy in FIG. 3 that, regardless of message type, all of the carrier tags 320 may be of uniform format. (In the case of tunnel labels, for example, messages of different types may even have the same tag value if they happen to be routed commonly.) The use of a uniform carrier tag format for all message types makes it possible for simple, generic handling of all traffic types through the access network using a uniform set of network elements that process traffic based on carrier tags. The switching elements within the access network may simply inspect the carrier tag(s) 320 of messages to determine how the message should be switched or routed without regard to message type or contents. In this manner, the access network becomes "service agnostic" and does not have to be concerned with the specifics of the protocols or addressing imbedded in the customer traffic. The generic nature of the carrier tag also allows for readily supporting any other message types not shown in FIG. 3, with little or no changes being required in the design and operation of the layer 2 switches 118 or other elements.

In some implementations, it may be desirable to prepend one or more tunnel labels (not shown) to the messages 310-318. A tunnel label allows a tunnel to be established throughout the access network, such as between a building aggregator and a service edge, improving scalability in the network. This mechanism may be particularly useful when many service emulation instances are to be routed to the same destination or service edge. By assigning the service emulation instances to a common tunnel, network elements, such as the layer 2 switch 118, may collectively route the service emulation instances within the tunnel by evaluating the tunnel label. In an exemplary embodiment, the tunnel label is an LSP label prepended to the messages 310-318. In accordance with the present teachings, tunnel labels may also be stacked to any degree needed to support a tunneling hierarchy, which may further facilitate efficient and scalable management of large numbers of flows.

Although the carrier-tagged flow payload 322 is shown and described as being kept essentially intact, it may be desirable in some situations to modify this original message. For example, the original message portion 322 of the Ethernet frame message 310 and the frame relay frame 314 frequently includes a frame check sequence (FCS). In many networks, the FCS is not used and may be removed. In other cases, the Ethernet frame check sequence (FCS) as received in the Ethernet frame may optionally be included, as is, rather than being deleted or recalculated by the building aggregation system 114. This can be advantageous for detecting errors or corruption of the data that might occur as the customer payload traverses the network.

Figure 4:
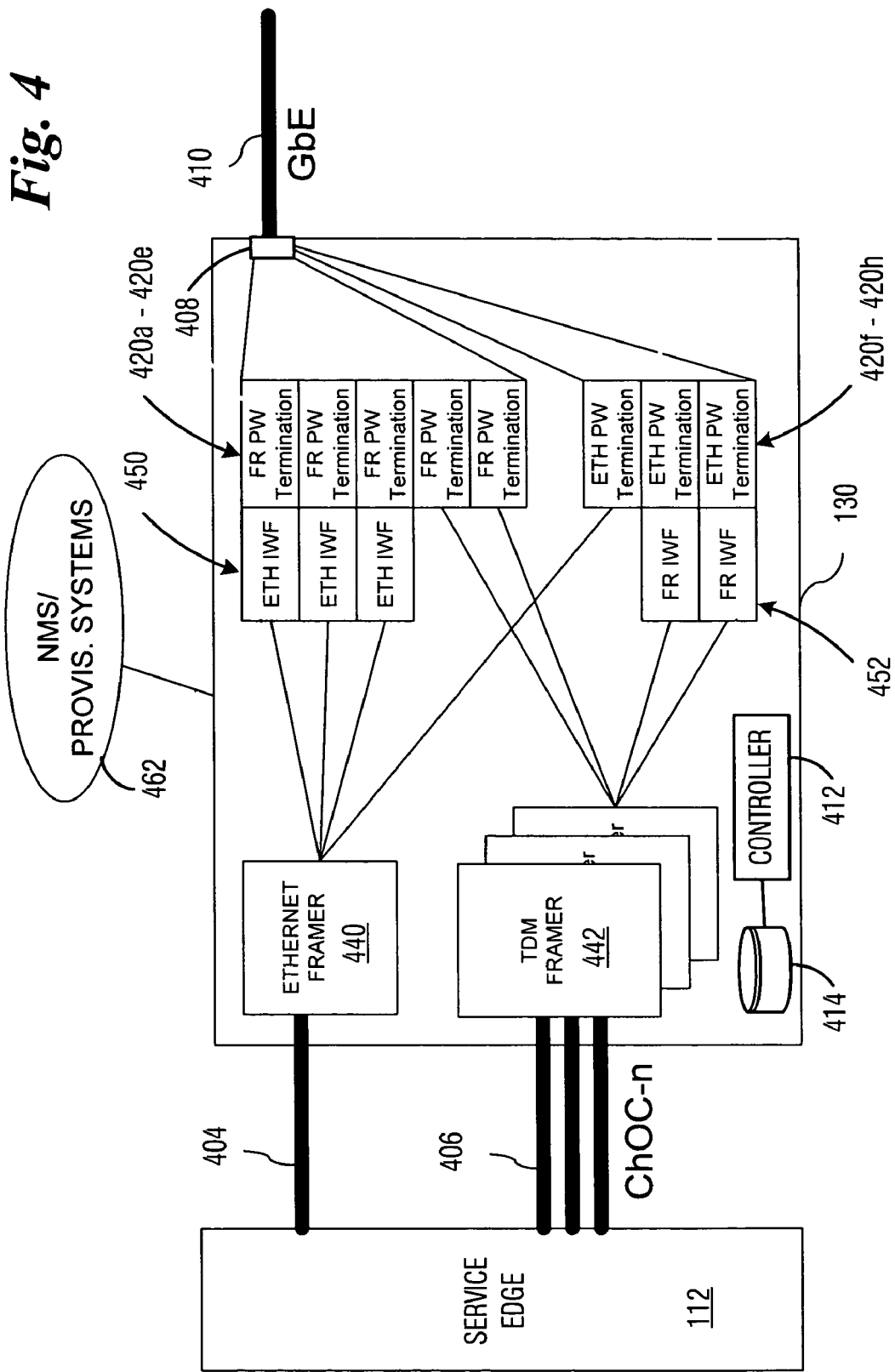
FIG. 4 is a block diagram including an exemplary embodiment of a service emulation instance terminator that may be used in accordance with an embodiment of the present invention.

FIG. 4 is a block diagram including an exemplary embodiment of a service emulation instance terminator that may be used in accordance with an embodiment of the present invention. The service emulation instance terminator 130 comprises a service emulation interface 408 to communicatively couple to a network element in the access network via communications link 410, which may be one or more communications link(s), such as a GbE or 10 GbE communications link from a layer 2 switch 118. Generally, the service emulation instance terminator 130 receives or transmits aggregated traffic via the communications link 410.

The service emulation instance terminator 130 is communicatively coupled to the service edge 112 (which may comprise a plurality of network elements) via one or more communications links. In the example illustrated in FIG. 4, the service emulation instance terminator 130 is communicatively coupled to the service edge 112 via one or more GbE or 10 GbE communications link 404 and TDM communications links 406, such as a channelized OC-n communications link. The illustrated communications links are provided for illustrative purposes only and, accordingly, may vary for any particular embodiment of the present invention.

Each service emulation instance terminator 130 may have one or service emulation end point components that could be used to terminate service emulation communications, e.g., traffic received from or transmitted on a service emulation instance over the communications link 410. An example of a service emulation end point is a pseudowire end point. For example, FIG. 4 illustrates an exemplary embodiment in which pseudowires are utilized to emulate frame relay services and Ethernet services. Accordingly, pseudowire end points 420a-420e represent service emulation end point components for pseudowires emulating frame relay services, and pseudowire end points 420f-420h represent service emulation end points for pseudowires emulating Ethernet services. Other types of service emulation end point components may be used to terminate other types of services, such as ATM services and the like.

One or more framers, such as Ethernet framer 440 and TDM framer 442, act as an interface to the communications links communicatively coupled to the service edge 112, e.g., communications links 404 and 406, respectively. The TDM framer 442 may receive traffic from a service emulation end point component (e.g., pseudowire end points 420) or an interworking function 450 to format and transmit TDM traffic, such as frame relay traffic, on a TDM channel which is then passed to the service edge 112. Similarly, the Ethernet framer 440 receives traffic from a service emulation end point component or an interworking function 450 and also formats and transmits Ethernet traffic on an Ethernet communications link. For example, frame relay traffic may have come through a pseudowire and appear in its re-created form at the end of service emulation end point component 420d. This frame relay traffic may then be passed to the TDM framer 442 which puts the frame relay traffic onto a TDM channel which is then passed to the service edge over a channelized OC-n interface 406.

The interworking function converts traffic among various types of traffic and may be dynamically configured to convert among types of traffic. For example, the Ethernet interworking function 450 may be configured to accept frame relay traffic along pseudowire end point 420a, to repackage the information, and as necessary, to convert any overhead information, port status information, error correction/data integrity check information, and flow control protocols to render a valid Ethernet representation corresponding to the frame relay information. The Ethernet framer 440 may add Ethernet framing data and transmit the traffic to the service edge 112. Another example is shown as frame relay interworking function 452 acts upon Ethernet traffic arriving along pseudowire end point 420h and renders a frame relay representation suitable for transport via a TDM framer 442.

The service emulation instance terminator 130 may further comprise a controller 412 and a database 414. The database 414 provides storage for mapping service emulation instance mapping identifiers to particular flows, and may contain instructions regarding whether or not an interworking function and a framer are to be applied. The controller 412 may be any general purpose or special purpose processor, such as an Application Specific Integrated Circuit (ASICs), Network Processors, Complex Instruction Set Computer (CISC), Reduced Instruction Set Computer (RISC), or the like.

In operation, the service emulation instance terminator 130 removes the service emulation instance mapping identifier that had been applied at the originating end of the service emulation instance. Similarly, traffic transmitted by the service emulation instance terminator 130 through the access network via a service emulation instance on the communications link 410 is encapsulated, which may include removing unneeded framing information, prepending the service emulation instance mapping identifier associated with the flow, and transmitting the traffic via the service emulation instance as packet data. The service emulation end point components of a service emulation instance may involve many other operations, such as defragmentation, as will be described in greater detail below.

In the course of emulating a type of transport service, each service emulation end point component may participate in any or all of the following operations to prepare traffic for carriage over a service emulation instance or to reconstruct traffic that has been received through a service emulation instance. Service emulation end point components may perform fragmentation and reassembly to accommodate maximum transmission unit (MTU) limitations of the underlying packet switch network transport. Service emulation end point components may be involved in concatenating small frames, such as ATM cells, to form larger packets that may be more efficiently transmitted through the underlying packet switched network. Service emulation end point components may also be involved in re-ordering of frames or packets, timing/buffering, detection of duplicated or missing portions of transmission, and carriage of control signals and keep alive signals compatible with a native service being emulated.

A management and provisioning system 462 can be communicatively coupled to the controller 412 (or other components) of the service emulation instance terminator 130 to provide provisioning and management functionality. In response to commands received from the management and provisioning system 462, service emulation instance terminator 130 may coordinate with other elements to resolve service emulation instance mapping identifiers, e.g., pseudowire labels, and to control the invocation of interworking functions to adapt service emulation instance access to the service edge as flexibly as possible. In this manner, the service provider is allowed considerable latitude to optimize how services are provided by the control of the service emulation instance terminator 130, especially by virtue of the flexibility afforded by the interworking functions. Whether coordinated through an external provisioning interface or by other mechanisms, an interworking function may be configured to adapt between a local customer site which may use a first type of transport and a remote customer site which may use a second type of transport different from the first. This ability to provide communications among diverse sites may be of commercial value to a service provider.

Furthermore, an interworking function may adapt between a first type of transport used by customer site and a second, different type of transport employed by a service edge or a core network. Applying interworking functions at both the service edge ingress and egress points along an end-to-end path through a core network allows a service provider to freely choose whatever form of core transport is preferred, independently of what transport type is experienced by the customer locations at either end of the path. The interworking function applied to a service emulation communications through a service emulation instance terminator 130 may be responsive to the transport type of the service emulation communications being different than the transport type associated with a core network or service edge, or different than a remote site to which communications is established through the service edge.

Figure 5:
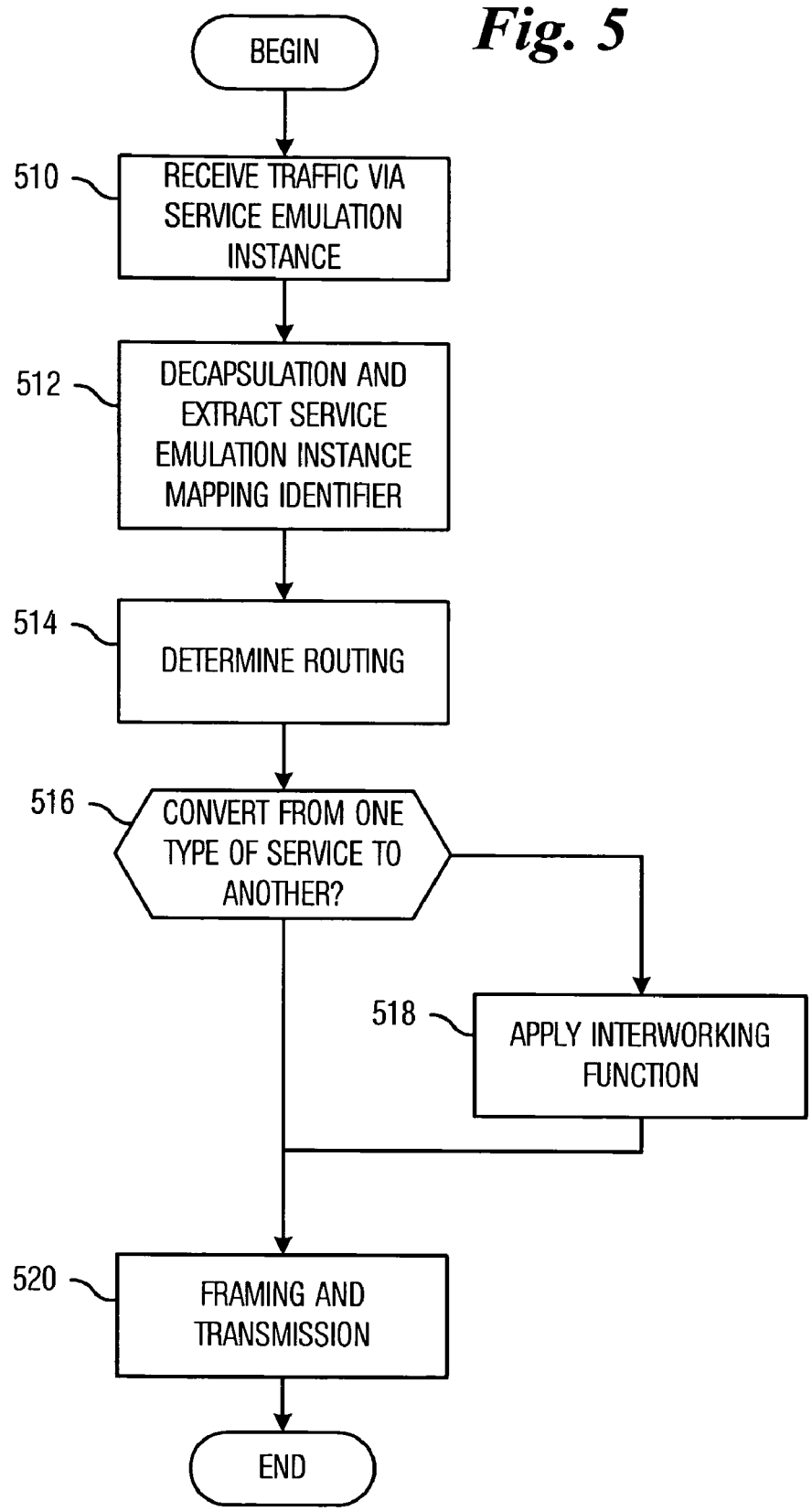
FIG. 5 is a data flow diagram in accordance with an embodiment of the present invention.

FIG. 5 is a data flow diagram in accordance with an embodiment of the present invention. In particular, FIG. 5 depicts steps that may be performed by the service emulation instance terminator 130 to receive traffic via a service emulation instance from the access network and transmit the traffic to the service edge 112. The process begins in step 510, wherein traffic is received via a service emulation instance. In one embodiment, traffic is received via a GbE or a 10 GbE communications link communicatively coupled to a layer 2 switch 118. The communications link may comprise a plurality of service emulation instances, each being identified by a locally unique service emulation instance mapping identifier that has been provisioned along the access path. In step 512, the service emulation communications is decapsulated to extract the native message and the service emulation instance mapping identifier. Here, the native message refers to the data traffic that has been submitted by a customer site to the access network for transmission to a service edge. The native message may also be referred to as the service emulation instance payload. Multiple service emulation instances mapping identifiers or other carrier tags may be received on the traffic due to the use of hierarchical encapsulation or nesting of tunnels or of service emulation instances within other tunnels or service emulation instances. In accordance with the present teachings, this stacking may occur to any degree. Consequently, the decapsulation in step 512 may involve removing multiple service emulation instance mapping identifiers or carrier tags from the service emulation communications in order to extract the native message in a form ready to be provided to service edge 112.

Next, in step 514, the service emulation instance terminator 130 uses the service emulation instance mapping identifier to determine the routing instructions. As discussed above, a service emulation instance mapping identifier is associated with a service edge a logical port. Accordingly, the service emulation instance mapping identifier is used to determine to which service edge and logical port the traffic associated with the service emulation instance mapping identifier is to be routed. In the event that multiple service emulation mapping identifiers or other carrier tags are present, the routing of traffic may take into account some or all of the tags. Some tags may correspond to a tunneling through the access network that is of no consequence to a service edge, whereas other tags may be essential to uniquely identifying a given flow. In the course of provisioning, for example, controller 412 and database 414, described earlier, may participate in managing the termination of nested tunnels or of service emulation instances and in manipulating and interpreting stacked carrier tags, such as stacked service emulation instance mapping identifiers. One mechanism in which the routing instructions may be determined is by the use of a look-up table indexed by the service emulation instance mapping identifier. Another mechanism that can be used is to encode in the service emulation instance mapping identifier information regarding the use of an interworking function, the port or service edge to which the traffic in the service emulation instance is to be routed or switched, content information, or the like. This may be implemented by assigning specific meanings to specific bits of the service emulation instance mapping identifier. Other mechanisms, such as dynamically requesting routing instructions from a routing system, may also be used.

The routing instructions further indicate whether or not an interworking function is to be invoked to convert between types of traffic. The interworking function may be desired, for example, in situations in which frame relay traffic is received, but is to be routed to an Ethernet interface in the service edge 112. The interworking function may also be desired in situations in which Ethernet traffic is received, but is to be routed to a TDM interface in the service edge 112. Interworking functions may be desired in other situations.

Accordingly, in step 516, a determination is made whether or not the traffic received via the service emulation instance should be converted from one type of service (or format) to another type of service (or format). If the determination is made that conversion is needed or desired, then processing proceeds to step 518, wherein the traffic from the service emulation instance is applied to the appropriate interworking function and the conversion is performed.

After step 516 or step 518, processing proceeds to step 520, wherein a framing and transmitting procedure is performed. To transmit the data, the data is put into the appropriate format or frames and transmitted in accordance with the corresponding signaling protocols. For example, if the traffic is to be transmitted via a TDM format, it is necessary to format the traffic as a TDM frame and to transmit the TDM frame with the appropriate signaling and framing protocols. Thereafter, the process terminates.

Figure 6:
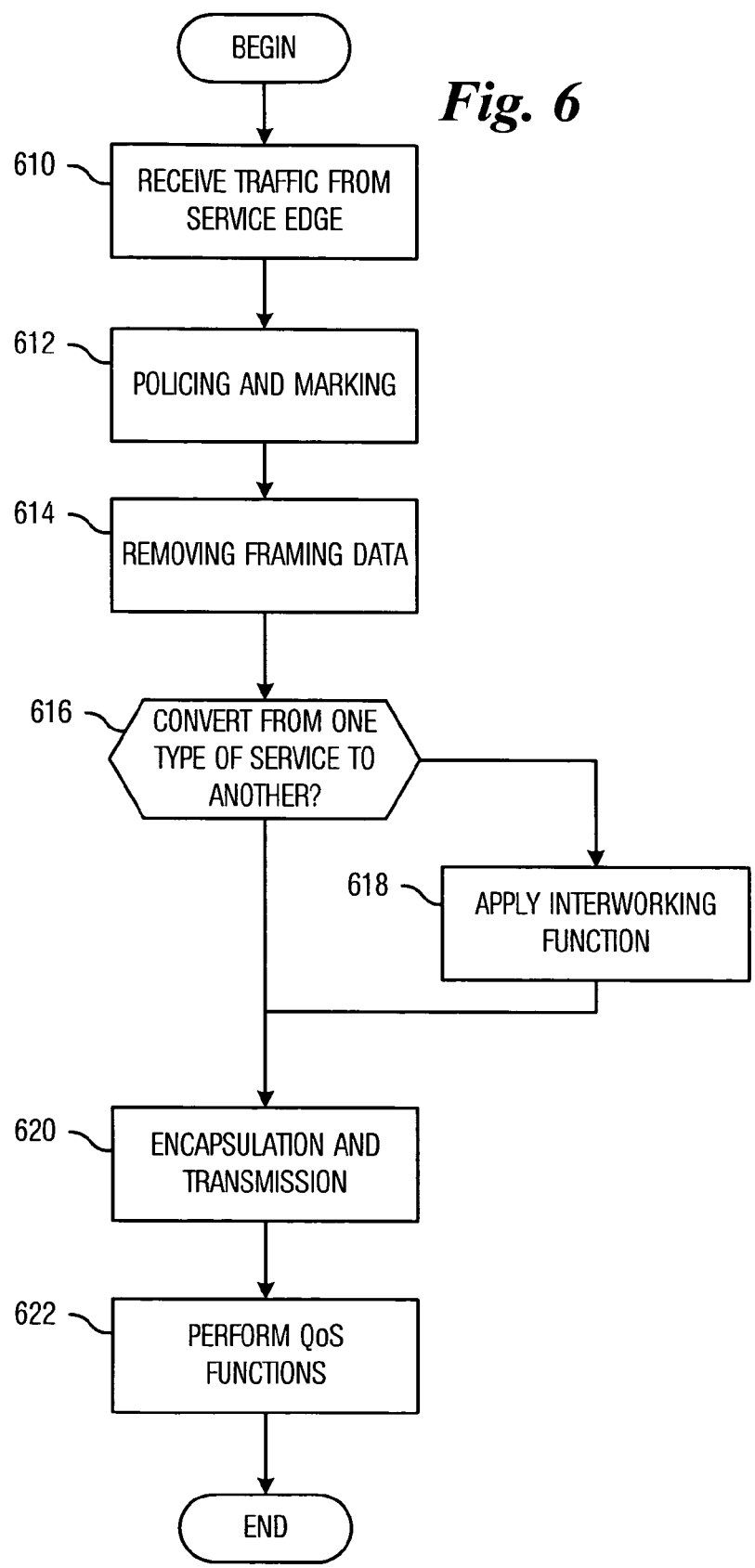
FIG. 6 is a data flow diagram in accordance with an embodiment of the present invention.

In particular, FIG. 6 depicts steps that may be performed by the service emulation instance terminator 130 to receive traffic from the service-edge 112 and transmit the traffic via a service emulation instance to the access network. The process begins in step 610, wherein traffic is received from the service edge 112. As discussed above, the service emulation instance terminator 130 may have a framer to interface with the various types of services or formats of the service edge 114, such as the TDM framer 442 (FIG. 4) and the Ethernet framer 440 (FIG. 4). Upon receipt of traffic from the service edge 112, the framers remove the framing information in preparation for transmitting the information along the access path via a service emulation instance, as illustrated in step 612. It should be noted that portions of the traffic corresponding to OSI Reference Model layers 2-7 may be left substantially unmodified. In this manner, the traffic may easily be recreated in its native form on the other end of the service emulation instance, such as the building aggregation system 114 (FIG. 1).

In step 614, a policing and marking function may be performed. Generally, policing (sometimes referred to as a rate-limiter or meter in Diffserv terminology) determines non-conforming packets of a classified flow based upon a specified traffic profile, for example, average rate and maximum burst duration and may drop non-conforming packets. Marking sets the value of the Ethernet priority or TOS/DSCP byte or MPLS EXPerimental (EXP) Bits, using information from the classifier and/or policer. In particular, MPLS LSPs have three experimental bits that are commonly used to signal relative priority or DiffServ Per Hop Forwarding Behavior (PHB). These bits, however, are not generally used for pseudowires or virtual circuits. In an embodiment, the EXP bits are used to signal relative priority or PHB, allowing a network to provide QoS on aggregate LSPs and to provide granular QoS on a per-pseudowire or per-flow basis.

In step 616, a determination is made whether or not the traffic is to be converted or translated from one type of service or transport to another type of service or transport, and if so, processing proceeds to step 618, wherein the traffic is converted or translated from one type of service or transport to another. For example, TDM traffic may be converted to packet data suitable for transport over an Ethernet link, or Ethernet traffic may be converted to TDM data suitable for transport over a TDM link. Other types of translations or conversions may be performed.

After steps 616 or 618, processing proceeds to step 620, wherein the traffic is encapsulated and transmitted via a service emulation instance. As discussed above, each service edge and logical port is associated with a service emulation instance mapping identifier (via the provisioning process). The encapsulation process involves determining the service emulation instance mapping identifier and encapsulating the traffic with the service emulation instance mapping identifier and transmission framing information. Where an access network may employ nesting of tunnels or of service emulation instances along communications link 410, the encapsulation of step 620 may involve appending multiple service emulation instance mapping identifiers or other carrier tags to the traffic. The encapsulated packets are then transmitted to the access network, which routes the traffic in accordance with routing instructions associated with the service emulation instance mapping identifier or tunnel (e.g., LSP label).

Next, in step 622, QoS functions, such as policing, rate shaping, classifying, marking, queuing, and scheduling, and the like may be performed to provide a specific quality of service (QoS). Generally, classifying selects packets based on fields in the packet headers. The classification may be based upon interface, incoming carrier tag, Ethernet priority, MPLS EXP bits, and/or Type of Service (TOS)/Diffserv Code Point (DSCP) in the IP header. Matching criteria may be, for example, exact, prefix-only, within a range, masked and/or the use of wildcard.

Shaping delays packets within a classified flow to cause them to conform to a specified traffic profile. The queuing function (or buffering) provides storage for packets prior to transmission. Queing also includes a function that determines which packets it admits. Examples of the admit function include a storage capacity or a threshold based upon packet marking. Scheduling selects a packet from a queue and transmits it onto an output link in accordance with a selection discipline, for example, priority queuing, or some form of weighted service across multiple queues.

Figure 7:
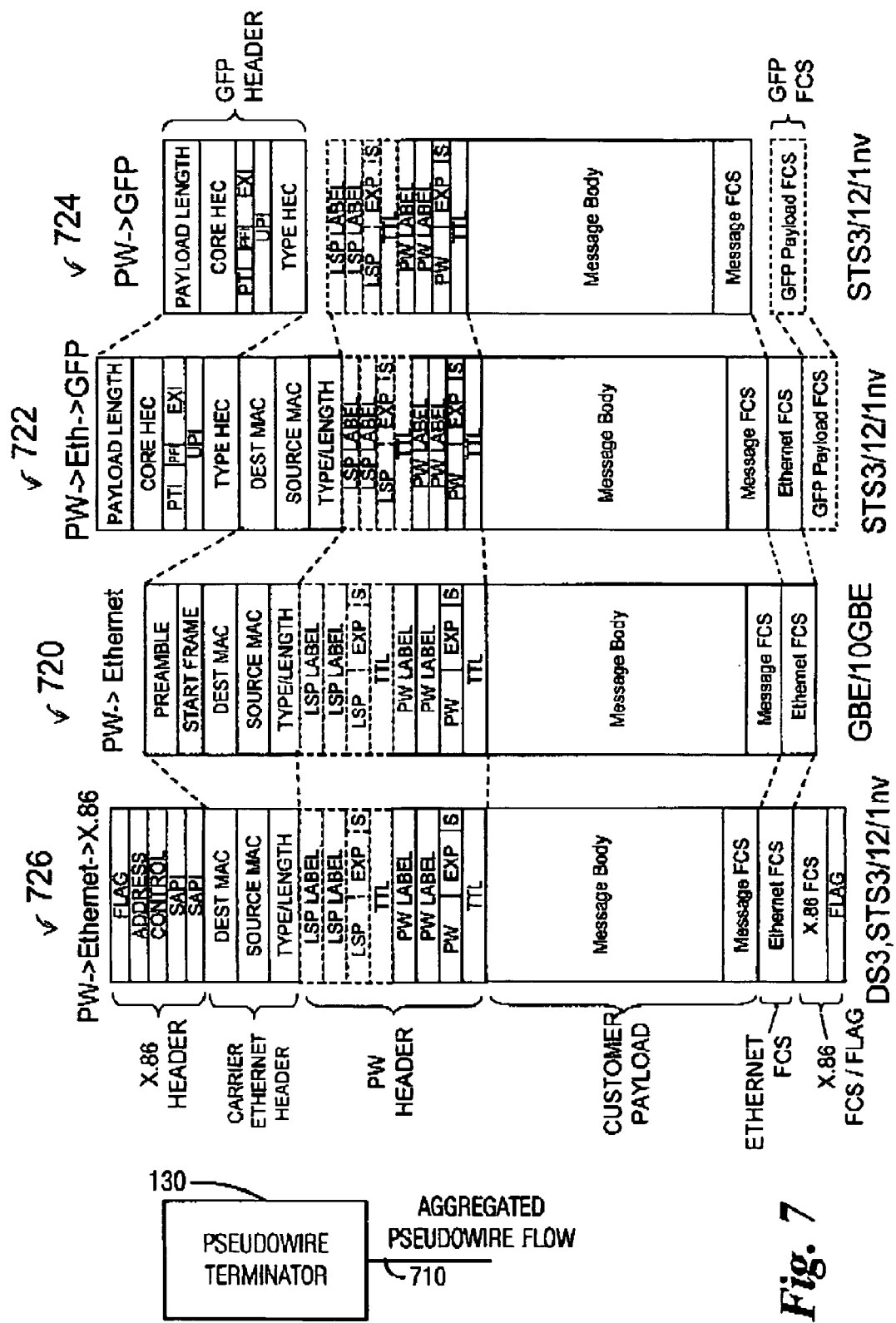
FIG. 7 illustrates framing formats in accordance with an embodiment of the present invention.

FIG. 7 illustrates framing formats in accordance with an embodiment of the present invention. In particular, FIG. 7 illustrates framing formats that may be utilized in an embodiment in which service emulation instances are implemented as pseudowires. The flows received or transmitted by the service emulation instance terminator 130 comprise an aggregated pseudowire flow 710. The aggregated pseudowire flow 710 may comprise pseudowire encapsulated in Ethernet frames 720 over a GbE or 10 GbE link, pseudowire encapsulated in Ethernet frames and GFP frames 722 over a STS-3, STS-12, or STS-1nv link, pseudowire encapsulated in GFP frames 724 over a STS-3, STS-12, or STS-1nv link, pseudowire encapsulated in X.86 frames 726 over a DS-3, STS-3, STS-12, or STS-1nv link, or the like. Other framing protocols and communications links may be used.

Upon receipt of a frame such as those illustrated in FIG. 7, the service emulation instance terminator 130 removes the framing and extracts the tunnel label and/or service emulation instance mapping identifier. The service emulation instance terminator 130, or other network element, utilizes the service emulation instance mapping identifier to determine how the flow is to be handled. Similarly, upon receipt of a flow from the service edge 112, the service emulation instance terminator 130 encapsulates the customer traffic with a pseudowire label (and possibly a tunnel label) and the appropriate framing, such as that illustrated in FIG. 7.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus for processing service emulation communications on a customer side of an access network prior to transmission through a service edge, wherein service emulation communications to and from the access network are aggregated, comprising:
   a service emulation interface for receiving service emulation communications, each of the service emulation communications comprising a service emulation instance payload that may differ in format from service emulation instance payloads of other service emulation communications, and at least one service emulation mapping identifier including at least the identification of the service emulation instance, the service emulation mapping identifiers of the service emulation communication having a uniform format;
   a service emulation end point component communicatively coupled to the service emulation interface, the service emulation end point component being configured to convert the service emulation communications to communications conforming to a first transport protocol; and
   an interworking function separate from and communicatively coupled to the service emulation end point component configured to convert the communications conforming to a first transport protocol to communications conforming to a second transport protocol, the first transport protocol being different fro the second transport protocol; wherein the interworking function sends the communications conforming to the second transport protocol to the service edge.

2. The apparatus of claim 1, wherein the first transport protocol is Frame Relay and the second transport protocol is Ethernet.

3. The apparatus of claim 1, wherein the first transport protocol is Ethernet and the second transport is Frame Relay.

4. The apparatus of claim 1, wherein the service emulation interface receives service emulation communications from a customer via an access network.

5. The apparatus of claim 1, wherein the interworking function sends the communications conforming to the second transport protocol to the service edge via a framer.

6. The apparatus of claim 1, further comprising a framer communicatively coupled to the interworking function and communicatively coupled to the service edge, the framer being configured to transmit communications conforming to the second transport protocol on a communications link.

7. The apparatus of claim 1, wherein the service emulation communications are received via a pseudowire.

8. The apparatus of claim 1, wherein the service emulation end point component terminates one or more pseudowires within a tunnel.

9. The apparatus of claim 8, wherein the tunnel is a label switched path.

10. The apparatus of claim 1, further comprising a controller configured to invoke the interworking function in response to receipt of an indication that the first transport protocol is different than the second transport.

11. The apparatus of claim 10, wherein the indication is received from a network management system.

12. An apparatus for processing service emulation communications on a custom side of an access network prior to transmission through a service edge, where service emulation communications to and from the access network are aggregated, the apparatus comprising:
a service emulation interface communicatively coupled to a user of a first transport protocol, the service emulation interface being configured to receive the service emulation communications, wherein the service emulation communications comprise at least one service emulation mapping identifier including at least the identification of a service emulation instance, the service emulation mapping identifiers of the service emulation communications having a uniform format;
a service emulation end point component communicatively coupled to the service emulation interface, the service emulation end point component being configured to extract service emulation instance payload from a service emulation communications; and
an interworking function, separate from and communicatively coupled to the service emulation end point component, the interworking function being configured to convert the service emulation instance payload conforming to the first transport protocol to communications conforming to a second transport protocol, wherein the first transport protocol is different from the second transport protocol; and wherein the interworking function sends the communications conforming to the second transport protocol to the service edge.

13. The apparatus of claim 12, wherein the service emulation interface is communicatively coupled to the user via an access network.

14. The apparatus of claim 12, wherein the interworking function is communicatively coupled to a framer configured for framing the communications in accordance with the second transport protocol.

15. The apparatus of claim 14, wherein the interworking function is communicatively coupled to a service edge via the framer.

16. The apparatus of claim 12, wherein the first transport protocol is Frame Relay and the second transport is Ethernet.

17. The apparatus of claim 12, wherein the first transport protocol is Ethernet and the second transport is Frame Relay.

18. The apparatus of claim 12, wherein the service emulation instance is a pseudowire.

19. The apparatus of claim 12, wherein the service emulation end point component terminates one or more pseudowires within a tunnel.

20. The apparatus of claim 19, wherein the tunnel is a label switched path.

21. The apparatus of claim 12, further comprising a controller configured to invoke the interworking function in response to receipt of an indication that the first transport protocol is different than the second transport protocol.

22. The apparatus of claim 21, wherein the indication is received from a network management system.

23. An apparatus for processing service emulation communications having one or more service emulation instances, on a customer side of an access network prior to transmission through a service edge, wherein the service emulation communications to and from the access network are aggregated, and wherein the service emulation communications comprise at least one service emulation mapping identifier for identifying a service emulation instance, the service emulation mapping identifiers having a uniform format, the apparatus comprising:
means for terminating a service emulation instance;
means for extracting a service emulation instance payload from the service emulation instance, the service emulation instance payload conforming to a first transport protocol;
means, separate from the means for extracting, for converging the service emulation communications from the first transport protocol to communications conforming to a second transport protocol, wherein the first transport protocol is different from the second transport protocol; and
means for communicatively coupling to a service edge the means for converting.

24. The apparatus of claim 23, further comprising means for framing the communications in accordance with the second transport protocol.

25. The apparatus of claim 23, further comprising means for communicatively coupling to an access network the means for terminating.

26. The apparatus of claim 23, wherein the first transport protocol is Frame Relay and the second transport protocol is Ethernet.

27. The apparatus of claim 23, wherein the first transport protocol is Ethernet and the second transport protocol is Frame Relay.

28. The apparatus of claim 23, wherein the service emulation instance is a pseudowire.

29. The apparatus of claim 23, further comprising means for invoking the means for converting upon receipt of an indication that the first transport protocol is different than the second transport protocol.

30. The method of claim 29, wherein the means for invoking receives the indication from a network management system.

31. An apparatus for processing service emulation communications on a customer side of a service edge, wherein the service emulation communications are aggregated, the apparatus comprising:
an interworking function communicatively coupled to a service edge, the interworking function being configured to convert communications conforming to a first transport protocol to communications conforming to a second transport protocol, the first transport protocol being different from the second transport protocol;

a service emulation end point component communicatively separate from and coupled to the interworking function, the service emulation end point component being configured to encode communications conforming to the second transport protocol into service emulation communications, wherein the service emulation communications comprise at least one service emulation mapping identifier for identifying a service emulation instance and a service emulation instance payload, the service emulation mapping identifiers having a uniform format while the format of the service emulation instance payload may differ; and a service emulation interface communicatively coupled to the service emulation end point component and an access network, the service emulation interface being configure to transmit service emulation communications on a service emulation instance.

32. The apparatus of claim 31, wherein the interworking function is communicatively coupled to the service edge via a framer, the framer being configured for extracting the communications from frames associated with the second transport protocol.

33. The apparatus of claim 31, wherein the first transport protocol is Frame Relay and the second transport protocol is Ethernet.

34. The apparatus of claim 31, wherein the first transport protocol is Ethernet and the second transport protocol is Frame Relay.

35. The apparatus of claim 31, wherein the service emulation instance is a pseudowire.

36. The apparatus of claim 31, wherein the service emulation end point component terminates one or more pseudowires within a tunnel.

37. The apparatus of claim 35, wherein the tunnel is a label switched path.

38. The apparatus of claim 31, further comprising a controller configured to invoke the interworking function in response to receipt of an indication that the first transport protocol is different than the second transport protocol.

39. The apparatus of claim 38, wherein the indication is received from a network management system.

40. An apparatus for processing service emulation communications on a customer side of an access network, wherein the service emulation communications to and from the access network are aggregated, the apparatus comprising:

a pseudowire terminator communicatively coupled to an access network, the pseudowire terminator being configured to act as one end of a pseudowire to receive communications corresponding to a first transport protocol, the communications comprising a service emulation mapping identifier having a uniform format for identifying a service emulation instance and a service emulation instance payload;

a framer communicatively coupled to a service edge and the pseudowire terminator, the framer being configured to insert framing data prior to transmission to the service edge; and an interworking function communicatively coupled to the pseudowire terminator and the framer, the interworking function configured to covert from communications received via the pseudowire terminator conforming to the first transport protocol to communications conforming to a second transport protocol suitable for framing by the framer.

41. The apparatus of claim 40, wherein the first transport protocol is Frame Relay and the second transport protocol is Ethernet.

42. The apparatus of claim 40, wherein the first transport protocol is Ethernet and the second transport protocol is Frame Relay.

43. The apparatus of claim 40, further comprising a controller configured to invoke the interworking function in response to receipt of an indication that the first transport protocol is different than the second transport protocol.

44. The apparatus of claim 43, wherein the indication is received from a network management system.

45. The apparatus of claim 40, wherein the pseudowire terminator terminates one or more pseudowires within a tunnel.

46. The apparatus of claim 45, wherein the tunnel is a label switched path.

47. The apparatus of claim 40, wherein the communications received by the pseudowire terminator comprise a plurality of service emulation mapping identifiers having uniform format for identifying service emulation instances and a service emulation instance payload.

48. An apparatus for processing and aggregating service emulation communication on a customer side of an access network, the apparatus comprising:

a framer communicatively coupled to a service edge, the framer being configured to extract communications conforming to a first transport protocol;

a pseudowire terminator communicatively coupled to an access network and the framer, the pseudowire terminator being configured to act as one end of a pseudowire to transmit the communications on an pseudowire, the communications comprising a service emulation mapping identifier having a uniform format for identifying a service emulation instance and a service emulation instance payload; and an interworking function communicatively coupled to the pseudowire terminator and the framer, the interworking function configured to convert from communications received via the framer conforming to the first transport protocol to communication conforming to a second transport protocol suitable for transmission by the pseudowire terminator.

49. The apparatus of claim 48, wherein the first transport protocol is Frame Relay and the second transport protocol is Ethernet.

50. The apparatus of claim 48, wherein the first transport protocol is Ethernet and the second transport protocol is Frame Relay.

51. The apparatus of claim 48, further comprising a controller configured to invoke the interworking function in response to receipt of an indication that the first transport protocol is different than the second transport protocol.

52. The apparatus of claim 51, wherein the indication is received from a network management system.

53. The apparatus of claim 48, wherein the pseudowire terminator terminates one or more pseudowires within a tunnel.

54. The apparatus of claim 53, wherein the tunnel is a label switched path.

55. The apparatus of claim 48, wherein the communications transmitted by the pseudowire terminator comprise a plurality of service emulation mapping identifiers having a uniform format for identifying service emulation instances and a service emulation instance payload.

56. A method for processing and aggregating service emulation communications on a customer side of an access network, comprising:

receiving communications in a first format associated with a first transport protocol; removing framing information associated with the first transport protocol;

converting the communications to a second format corresponding to a second transport protocol; encoding the communications in the second format to form service emulation communications, wherein the encoding includes prepending at least one service emulation instance mapping identifier for identifying a service emulation instance, wherein the service emulation instance mapping identifiers are of uniform format regardless of the format of the communication to which it is prepended; and transmitting the service emulation communications over a service emulation instance.

57. The method of claim 56, wherein the encoding includes prepending a tunnel label.

58. The method of claim 56, wherein the service emulation instance is a pseudowire.

59. The method of claim 56, wherein the receiving includes receiving communications from a service edge.

60. The method of claim 56, wherein the transmitting includes transmitting the service emulation communications to a customer via an access network.

61. The method of claim 56, wherein the first transport protocol is Frame Relay and the second transport protocol is Ethernet.

62. The method of claim 56, wherein the first transport protocol is Ethernet and the second transport protocol is Frame Relay.

63. The method of claim 56, wherein the converting is in response to receipt of an indication that the first transport protocol is different than the second transport protocol.

64. The method of claim 63, wherein the indication is received from a network management system.

65. A non-transitory computer readable medium encoded with computer program codes, which when executed, perform processing and aggregating of service emulation communications on a customer side of an access network prior to transmission through a service edge, the computer program comprising:

computer program code for receiving service emulation communications on a service emulation instance from a customer via an access network, an decapsulating the service emulation communications by removing at least one service emulation instance mapping identifier identifying the service emulation instance, wherein the service emulation instance mapping identifiers are of uniform format regardless of the format of the communication to which it is attached, the service emulation communications comprising a service emulation payload corresponding to a first transport protocol;

computer program code for converting the service emulation instance payload to a second format corresponding to a second transport protocol, the first transport protocol being different from the second transport protocol; and computer program code for transmitting the service emulation instance payload in the second format to the service edge on a communications link corresponding to the second transport protocol.

66. The non-transitory computer readable medium of claim 65, wherein the computer program code for decapsulating includes computer program code for removing a tunnel label.

67. The non-transitory computer readable medium of claim 65, wherein the service emulation instance is pseudowire.

68. The non-transitory computer readable medium of claim 65, wherein the service emulation instance is a pseudowire within a tunnel.

69. The non-transitory computer readable medium of claim 65, wherein the first transport protocol is Frame Relay and the second transport protocol is Ethernet.

70. The non-transitory computer readable medium of claim 65, wherein the first transport protocol is Ethernet and the second transport protocol is Frame Relay.

71. The non-transitory computer readable medium of claim 65, further comprising computer program code for associating the service emulation instance with a port communicatively coupled to the service edge.

72. The non-transitory computer readable medium of claim 71, wherein the computer program code for associating comprises computer program code for dynamically receiving associations via a network management system.

73. The non-transitory computer readable medium of claim 65, further comprising computer program code for framing the communications for transmission on the second transport protocol.

74. The non-transitory computer readable medium of claim 65, wherein the computer program code for converting is performed in response to a receipt of an indication that the first transport protocol is different than the second transport protocol.

75. The non-transitory computer readable medium of claim 74, wherein the indication is received from a network management system.

76. A non-transitory computer readable medium encoded with computer program codes, which when executed, perform processing and aggregation of service emulation communications on a customer side of an access network, the computer program comprising: computer program code for receiving communications in a first format associated with a first transport protocol; computer program code for removing framing information associated with the first transport protocol; computer program code for converting the communications to a second format corresponding to a second transport protocol; computer program code for encoding the communications in the second format to form service emulation communications, the encoding including prepending at least one service emulation instance mapping identifier for identifying a service emulation instance, wherein the service emulation instance mapping identifiers are of uniform format regardless of the format of the communication to which it is prepended; and computer program code for transmitting the service emulation communications over a service emulation instance.

77. The non-transitory computer readable medium of claim 76, wherein the computer program code for encoding includes computer program code prepending a tunnel label.

78. The non-transitory computer readable medium of claim 76, wherein the service emulation instance is a pseudowire.

79. The non-transitory computer readable medium of claim 76, wherein the computer program code for receiving include computer program code receiving communications fro a service edge.

80. The non-transitory computer readable medium of claim 76, wherein the computer program for transmitting include computer program code transmitting the service emulation communications to a customer via an access network.

81. The non-transitory computer readable medium of claim 76, wherein the first transport protocol is Frame Relay and the second transport protocol is Ethernet.

82. The non-transitory computer readable medium of claim 76, wherein the first transport protocol is Ethernet and the second transport protocol is Frame Relay.

83. The non-transitory computer readable medium of claim 76, wherein the computer program code for converting is performed in response to a receipt of an indication that the first transport protocol is different than the second transport protocol.

84. The non-transitory computer readable medium of claim 83, wherein the indication in received from a network management system.

* * * * *